(12) United States Patent
Franc et al.

(10) Patent No.: US 8,734,184 B2
(45) Date of Patent: May 27, 2014

(54) SENSOR OR DETECTOR DEVICE WITH AN IMPROVED CABLE GUIDE PLUG

(75) Inventors: Joël Franc, Eckbolsheim (FR); Remy Kirchdoerffer, Grancy (CH)

(73) Assignee: SENSTRONIC (Société par Actions Simplifiée), Saverne (FR)

( * ) Notice: Subject to any disclaimer, the term of this patent is extended or adjusted under 35 U.S.C. 154(b) by 25 days.

(21) Appl. No.: 13/549,728

(22) Filed: Jul. 16, 2012

(65) Prior Publication Data

US 2013/0017727 A1    Jan. 17, 2013

(30) Foreign Application Priority Data

Jul. 15, 2011   (FR) ...................... 11 56466

(51) Int. Cl.
*H01R 13/66* (2006.01)

(52) U.S. Cl.
USPC .................................... 439/620.01

(58) Field of Classification Search
USPC .......... 439/620.01, 578, 541.5, 491; 324/690, 324/173; 174/50; 29/841
See application file for complete search history.

(56) References Cited

U.S. PATENT DOCUMENTS

| | | | | |
|---|---|---|---|---|
| 4,811,165 A | * | 3/1989 | Currier et al. | 361/716 |
| 5,485,672 A | * | 1/1996 | Carpenter et al. | 29/841 |
| 5,789,920 A | * | 8/1998 | Gass | 324/260 |
| 6,072,312 A | * | 6/2000 | Van Den Berg | 324/207.16 |
| 7,097,497 B2 | * | 8/2006 | Kikuchi | 439/541.5 |
| 7,537,482 B2 | * | 5/2009 | Burris et al. | 439/578 |
| 7,649,349 B2 | * | 1/2010 | Schoen et al. | 324/173 |
| 8,444,325 B2 | * | 5/2013 | Guest | 385/53 |
| 8,445,778 B2 | * | 5/2013 | Merritt et al. | 174/50 |
| 8,513,960 B2 | * | 8/2013 | Schneider et al. | 324/690 |
| 2001/0023153 A1 | | 9/2001 | Mayer et al. | |
| 2007/0217179 A1 | | 9/2007 | Schoen et al. | |
| 2009/0203269 A1 | | 8/2009 | Jenne et al. | |

FOREIGN PATENT DOCUMENTS

| | | |
|---|---|---|
| DE | 195 04 608 A1 | 8/1996 |
| DE | 195 44 815 C1 | 4/1997 |
| WO | 2005/064278 A2 | 7/2005 |
| WO | 2007/131374 A1 | 11/2007 |

OTHER PUBLICATIONS

French Search Report, dated Mar. 6, 2012, from corresponding French application.

* cited by examiner

*Primary Examiner* — Alexander Gilman
(74) *Attorney, Agent, or Firm* — Young & Thompson

(57) ABSTRACT

A sensor or detector device includes a box in the form of a tubular hollow body, through whose opening a connecting cable passes and that is sealed by a connected plug. The device also includes a card or an analogous substrate, carrying the electronic components of the sensor or detector and mounted in the box, by being coated by an insulating filler material filling approximately the entire remaining inside volume of the latter. The Device (1) is characterized in that it includes a mechanical element for the positioning with wedging of the card (6) in the box, preferably along a median plane or with longitudinal symmetry (PM) of the latter, with at least a portion of the element being integrated in the plug (5).

18 Claims, 4 Drawing Sheets

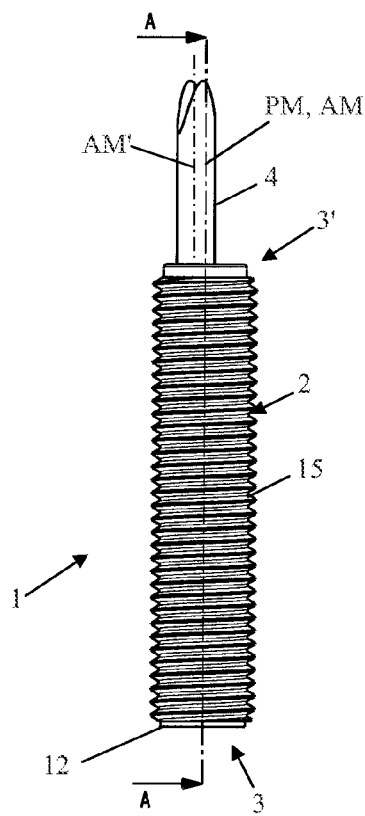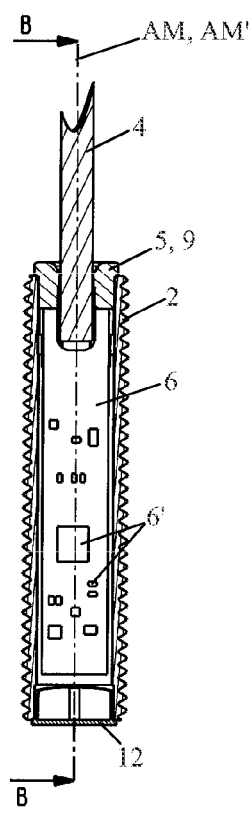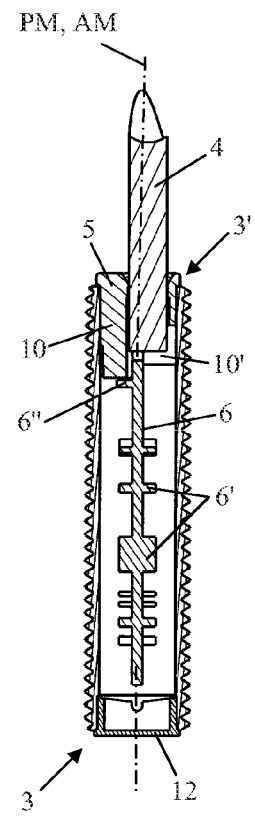
Fig. 1  Fig. 2A  Fig. 2B
Fig. 2

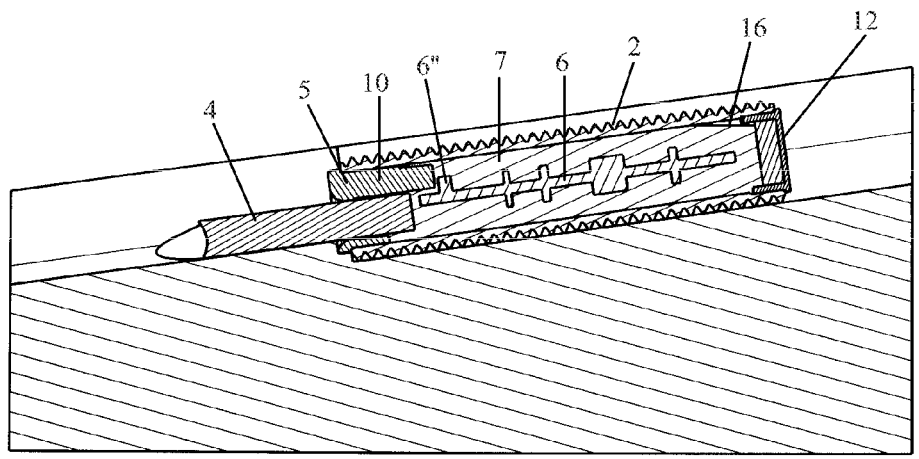
Fig. 3
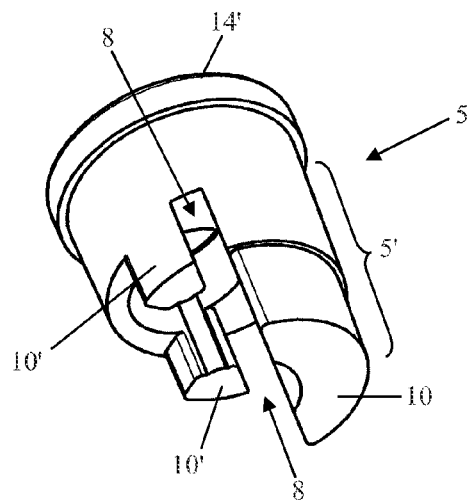
Fig. 4A
Fig. 4
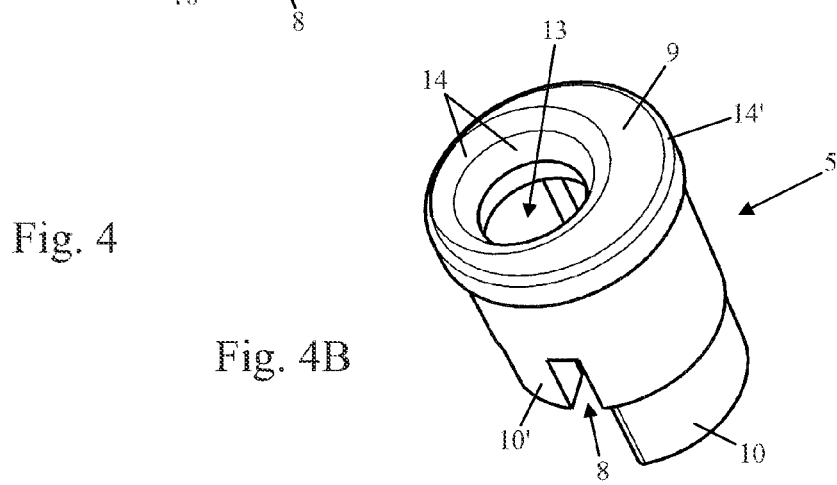
Fig. 4B

SENSOR OR DETECTOR DEVICE WITH AN IMPROVED CABLE GUIDE PLUG

This invention relates to the field of electronic devices in which an electronic card is mounted in a box and a coating material is used to protect and insulate said card and to ensure its locking in position in the box.

More particularly, the invention relates to a sensor or detector device, comprising a box in the form of a tubular hollow body, preferably with a circular cross-section, with a first longitudinal end that forms an active surface and a second end, opposite to the first, through whose opening the connecting cable passes and that is sealed by a connected plug. This device also comprises a card or an analogous substrate, carrying the electronic components of said sensor or detector and mounted in said box, by being coated, preferably completely embedded, in an insulating filler material, such as a resin or the like, also present in said box and filling approximately the entire remaining inside volume of the latter.

BACKGROUND OF THE INVENTION

A specific difficulty for the production of this type of device resides in the necessity for avoiding any contact between, on the one hand, the electronic card and the components that it carries, and, on the other hand, the box that is generally metal for electrical reasons (short-circuiting, grounding) and mechanical reasons (shocks, vibrations), while promoting, if possible, an optimal coating of the card and components (limiting possible obstacles to the homogeneous distribution of the resin in the box and coating of the majority of the card).

Through the document DE-A-195 04 608, a sensor device of the above-mentioned type and a process for the production of such a sensor device are known. More specifically, this prior document has two embodiments of such a sensor and its production process in relation to FIGS. 1 and 2, on the one hand, and to FIGS. 3 and 4, on the other hand.

Within the framework of the first embodiment (FIGS. 1 and 2), a sealing plug that forms a connector (with pins), i.e., through which no connecting cable passes, is provided. This sealing plug comprises a wide cavity that accommodates an end extension of the card, carrying a DEL. This extension is accommodated in free engagement and without wedging in the above-mentioned cavity and is to be immobilized and secured by sealing in the latter by means of a glue 62.

Within the framework of the second embodiment of the document DE 195 04 608 (FIGS. 3 and 4), a connecting cable is provided for the card. This cable passes through a body that forms a sealing plug and that accommodates by engagement an end part of the card. However, this plug is an over-molded part, both on the card and on the cable.

A first object of the invention is to propose a simpler solution to the problem disclosed above.

In addition, it is often advantageous for this type of device to be able to visually indicate a state or their state among several possible states (detection, absence of detection, malfunction, . . . ) by a light display that is visible at the box.

The installation of the signaling means on the box or integration within the wall of the box is not optimal, taking into account mounting conditions and environments in which these devices are used.

A known solution can consist in mounting the light sources of the signaling means inside the box and in transmitting the light information for signaling by light transmission means (light guide).

Nevertheless, the result is the necessity for a specific positioning of the light guide(s) relative to the source(s) and the specific development of (a) guide(s) that is/are suitable for the above-mentioned type of devices, without interfering with the first object of the invention and by preserving the integrity and the sealing of the device.

A possible second object of the invention is to propose a simple solution to this second problem.

Finally, a possible third object of the invention is to propose a solution to the two problems disclosed above without multiplying the components, without complicating the general composition of the device in question and/or without complicating its production process in a significant way.

SUMMARY OF THE INVENTION

For the purpose of providing a solution at least to the first problem above, the invention has as its object a sensor or detector device of the type mentioned above that is characterized in that it comprises a mechanical means for the positioning and wedging of the card in the box, preferably along a median plane or with longitudinal symmetry of the latter, with at least a portion of said means being integrated in the plug and consisting of at least a portion of a groove or slot that can accommodate by engagement one end of said card to hold it wedged.

BRIEF DESCRIPTION OF THE DRAWINGS

The invention will be better understood owing to the description below, which relates to preferred embodiments, provided by way of non-limiting example, and explained with reference to the accompanying diagrammatic drawings, in which:

FIG. 1 is a side-elevation view of a sensor or detector device according to one embodiment of the invention;

FIG. 2A is a cutaway view along A-A of the device that is shown in FIG. 1;

FIG. 2B is a cutaway view along B-B of the device that is shown in FIG. 2A;

FIG. 3 is a cutaway view of the device of FIGS. 1 and 2 during the solidification phase of the injected filler material;

FIGS. 4A and 4B are perspective views in two different directions of the plug that is part of the device according to the invention;

DETAILED DESCRIPTION OF THE PREFERRED EMBODIMENTS

Figures 2, 2C:
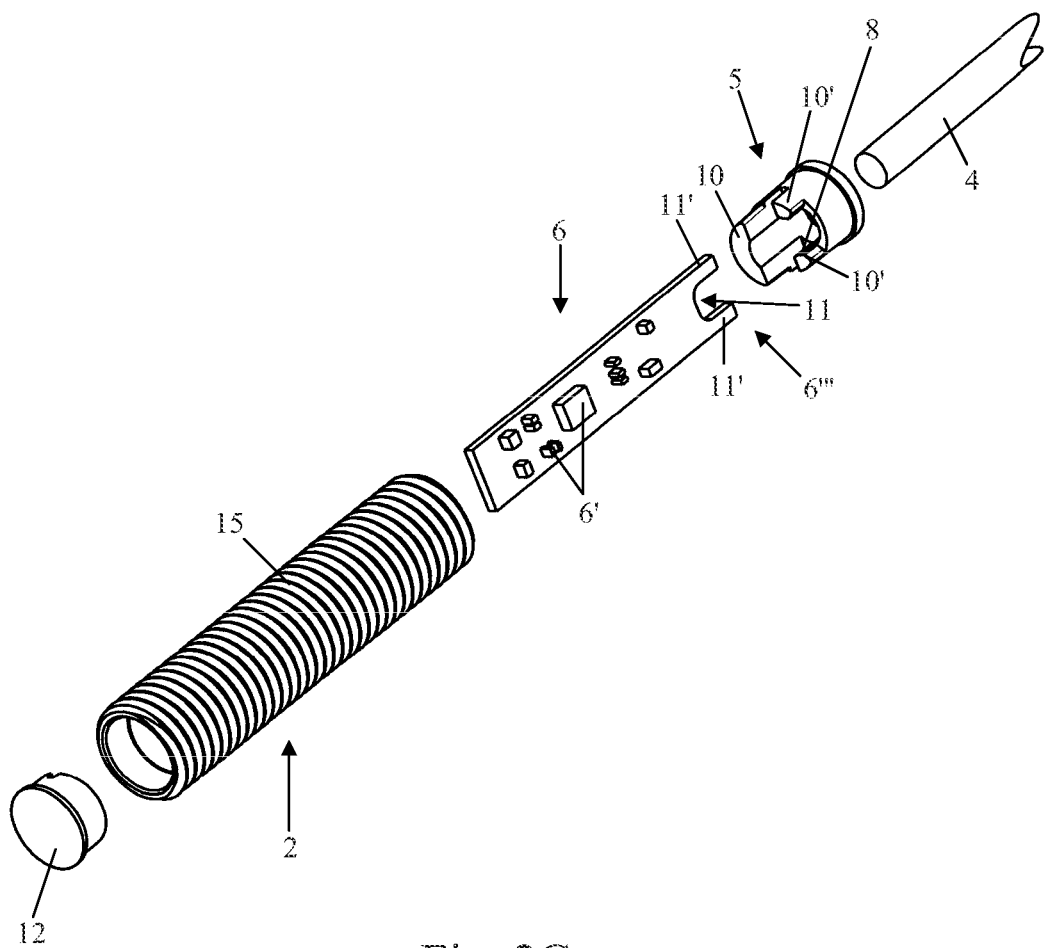
FIG. 2C is an exploded view of the device that is shown in FIGS. 1, 2A and 2B before assembly.
Figure 5:
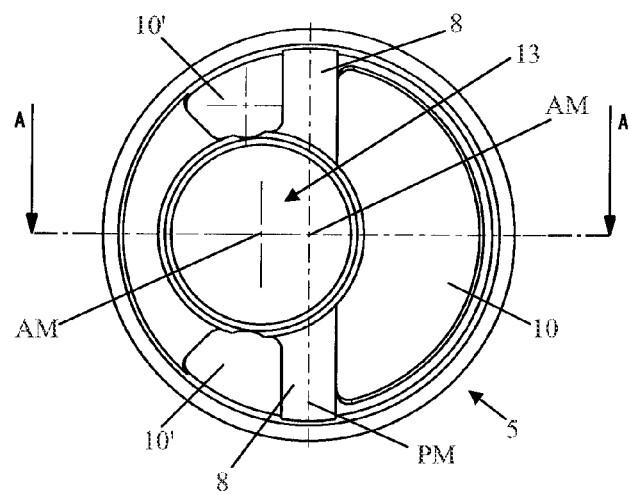
FIGS. 5A, 5B and 5C are respectively bottom, top and side-elevation views of the plug that is shown in FIGS. 4A and 4B.
FIG. 5D is a cutaway view along A-A of the plug that is shown in FIG. 5A.
Figure 5:
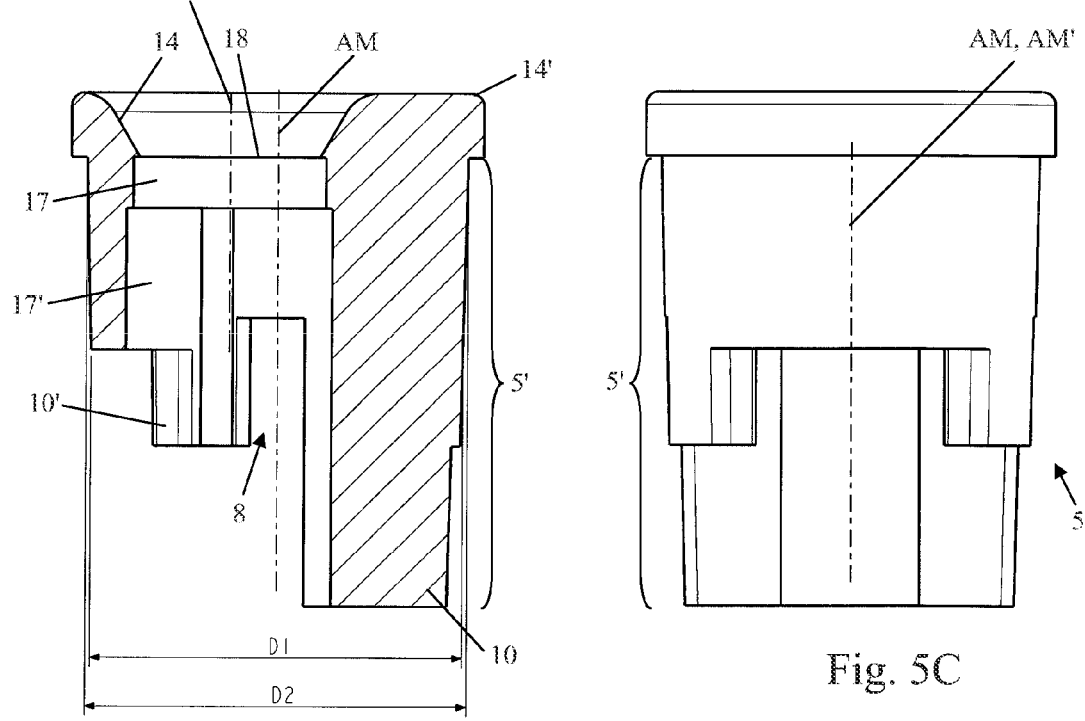
Figure 5:
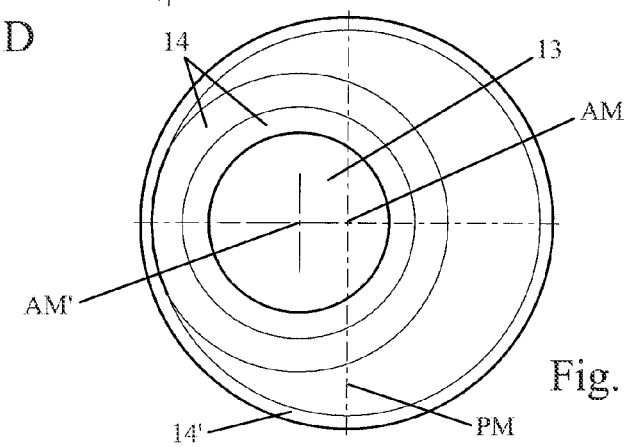

FIGS. 1, 2, and 3 show a sensor or detector device 1, comprising a box 2 in the form of a tubular hollow element, preferably with a circular cross-section, with a first longitudinal end 3 that forms an active surface and a second end 3', opposite to the first, through whose opening the connecting cable 4 passes and that is sealed by a connected plug 5, produced separately. This device 1 also comprises a card or an analogous substrate 6, carrying the electronic components 6', 6" of said sensor or detector and mounted in said box 2, by being coated, preferably completely embedded, in an insulating filler material 7, such as a resin or the like, present in said box and filling approximately the entire remaining inside volume of the latter.

In accordance with the invention, the device 1 comprises a mechanical means 8 for positioning with wedging of the card 6 in the box 2, preferably along a median plane or with longitudinal symmetry PM of the latter, at least a portion of said means 8 being integrated in the plug 5 and consisting of at least one portion of a groove or slot that can accommodate by engagement one end 6''' of said card 6 for the purpose of its being held wedged.

The provision of a means 8 makes it possible to ensure a repeatable, preferably centered, positioning of the card 6 in the box 2 during the assembly of the device 1 and during the phase of injection and solidification of the filler material 7. Thus, the card 6 is held in an indexed position that is determined by simple mechanical engagement (preferably adjusted) or interlocking of the end 6''' of the card 6 in a groove 8 or groove portions 8. Of course, the card 6 with its components 6', 6'' will be shaped and sized so as not to come into contact with the box 2 (ensuring a minimal insulating distance at least at sensitive regions—no need for an insulating inner coating) when it is wedged in a mounting position by the means 8, thus allowing its optimal coating.

In addition, by integrating at least a portion of the means 8 in the plug 5 ensuring the sealing of the box 2, multiplication of components is avoided while at least partially performing an additional function.

According to an advantageous embodiment of the invention, and as FIGS. 2C, 4, 5A and 5D show, the means 8 for the positioning and the wedging is entirely integrated in the plug 5 and comprises at least one portion of a groove or slot 8 that is made in the plug 5, for example at least partially bordered by projecting formations 10, 10' that extend the interlocked longitudinal portion 5' of said plug 5, with said groove or slot portion being able to accommodate, to be held wedged, the end of the card 6 that is located close to the second end 3' of the box 2.

The groove 8 can be a continuous groove, in one piece, or a composite groove, i.e., with a discontinuous structure, formed by several aligned and mutually spaced groove portions.

Being held wedged is essentially defined as a locking-in-position in a direction that is perpendicular to the plane of the groove or portions of groove 8 (plane merged with the plane PM in FIGS. 1, 2B, 5A and 5B), but also wedging at the bottom of the composite groove 8 (locking in the longitudinal direction of the box 2). Optionally, the end of the card 6 can also be at least slightly pinched between the formations 10, 10'.

Preferably, the means 8 for the positioning that is present at the plug 5 consists of two groove portions 8 that are spaced and aligned along a median plane PM of the box 2, and the card 6 has, at its end located closed to the second end 3' of the box 2, a cut-out 11 that defines two feet or side wings 11' that are designed to engage in said groove portions 8 of the plug 5.

This cut-out 11 allows the introduction of an increased length of cable 4 in the box 2 and makes it possible for the latter to participate in an automatic centering of the card 6 relative to the plug 5 and therefore also relative to the box 2 (the end of the cable 4, rigidly held in the plug 5, extends between the two feet 11' and thus prevents any movement of the end 6''' of the card 6 in the plane AM of the groove portions 8).

According to a characteristic of the invention, it may be provided that the card 6 is accommodated in the groove portions forming the mechanical means 8 of positioning and wedging, preferably at the level of two feet or wings 11' of an end with pinching, at least enough to hold said card 6.

The card 6 is thus held at only one of its two opposite ends, allowing an optimal positioning and a limited interference with the coating.

In an advantageous manner, and to make possible in particular an indexing of the device 1 and/or to facilitate the connection with the card 6, the plug 5 comprises a passage opening 13 for the cable 4, which is offset relative to the longitudinal median axis AM of the box 2. This passage opening 13 that passes through the sealing body 9 (for example disk-like) of the plug 5 advantageously has a longitudinal extension that is designed in such a way that said plug 5 forms a cable-guide sleeve (FIGS. 1, 2B, 3 and 5).

The provision of a plug 5 that has a certain thickness also makes it possible to define annular contact surfaces of great height or width between this plug and the inside surface of the open end of the box sealed by this plug (in such a way as to ensure good sealing).

Advantageously, it may also be provided that the median axis AM' of the passage opening 13 is offset laterally relative to the median plane PM of the box 2, that the connecting cable 4 extends just into the cut-out 11 made in the corresponding end of the card 6, and that the projecting formations 10, 10' that define the groove portions 8 extend in a fractional manner the cable-guide sleeve that is defined by the passage opening 13, in at least the interlocked portion 5' of the plug 5. Thus, the result is a lateral hold of the cable 4 up to the level of the card 6, while allowing a coating of said cable 4 and the end of the card 6 because of the discontinuous nature of the formations 10, 10' (presence of cleared intermediate spaces).

According to a practical variant embodiment of the invention, making it possible to increase even further the mechanical strength of the cable 4, in particular its resistance to detachment relative to the box 2 by fraction, it may also be provided that the passage opening 13 for the connecting cable 4 of the device 1 has variable cross-sections along its longitudinal median axis AM' and preferably comprises at least one first longitudinal segment 17 that is open on the outside, of which the cross-section corresponds to that of said cable 4 and at least a second longitudinal segment 17' that is open on the inside, whose cross-section is at least slightly larger than that of said cable 4. The first segment 17 can optionally end by a radially projecting annular formation that constitutes an oriented holding collar, followed by a beveled widening 14, and the second segment 17' can extend by the projecting formations 10, 10' of the means 8 for the integrated positioning with the plug 5.

The presence of the filler material 7 over a long length around the cable 4 also imparts reinforced protection against the risks of water or moisture infiltrating.

In accordance with a first variant embodiment of the invention, not shown, a separate light guide can be installed in the box 2 to ensure the transmission of light signals of state of a source 6'' that is carried by the card 6 toward the outside.

Nevertheless, in accordance with a second preferred variant embodiment of the invention, emerging from the accompanying drawings, ending in an optimized functional integration, without an additional component, the plug 5 comprises a projecting formation 10, extended from the interlocked portion 5', whose end is designed to come into immediate proximity or into contact with at least one light source 6'' that is carried by the card 6, at least the part of the plug 5 whose projecting formation 10 forms an extension, and preferably all of said plug 5, being produced from a material that can transmit light, for example an essentially transparent or at least translucent plastic material.

Thus, the plug 5 itself, or at least a portion of the latter, constitutes a light guide.

In addition, taking into account the wedged positioning of the card 6 relative to the plug 5, this integrated light guide is systematically located in an optimal manner relative to the light signaling component(s) 6", for example of the DEL (electroluminescent diode) type.

According to a preferred practical embodiment, the projecting formation 10 of the plug 5 that is designed to transmit the light from at least one light source 6" that is carried by the card 6 corresponds to one of the formations 10, 10' defining the groove or slot portion(s) 8.

Thus, the composite groove 8 in which the card 6 is positioned ensures a repeatable positioning and therefore a constant and identical distance (guide 10/DEL 6") while always being located as close as possible to the guide (formation 10), preferably in contact with it.

This proximity allows an effective transmission of the light by minimizing the distance (DEL/guide), without thereby disregarding the coating of the DEL by the resin 7, thus contributing to a protection of the DEL against the intrusion of water or moisture.

To facilitate the introduction of the cable 4 into the opening 13 and its being bent close to the inlet of this opening, it may be provided that the passage opening 13 of the plug 5 comprises, at its opening toward the outside, a beveled edge 14. In an additional or alternative manner, a beveled edge 14' is optionally made on the outside support of the portion of the plug 5 that is not interlocked in the box 2 and preferably supported on the edge of the second end 3' of the tubular box 2.

The beveled edge(s) 14, 14' make(s) it possible, when the plug 5 forms a light guide, to produce a radial diffusion of the light with a "light ring" effect, also visible laterally.

The beveled edge 14 can optionally be a double beveled edge or have two different slopes.

Depending on its type of mounting, the box 2 can have a defined outside shape. In particular, it may be provided that it consists of a socket, preferably metal and with outside threading 15.

Finally, in an additional way, the interlocked longitudinal portion of the plug 5 can advantageously have a tapered shape.

Thus, while being made of a rigid plastic material (because of its generally small dimensions), for example polypropylene or polyamide, this type of plug 5 with a conical outside shape can be assembled without resorting to glue (neither for sealing nor for locking the assembly), thus simplifying the assembly of the final product.

Actually, while facilitating the introduction of the plug 5 into the socket 2, when it almost rests on the end 3' of the socket 2, its conical shape imparts to said plug 5 a slight mounting by force, which despite the low elasticity of the plastic material that composes it, gives it the possibility of being mounted by being slightly adjusted, without thereby damaging the socket.

This conical shape of the plug 5 also contributes to the evacuation of a good portion of the air that is contained in the socket 2 and this almost until the plug 5 reaches maximum insertion.

Thanks to the integration into the box and the complete coating of the components and the card, the invention makes it possible to end in a double insulation between, on the one hand, the electronic components (including light signaling) and the card, and, on the other hand, the outside, allowing supply and operation with high voltage, where there is no danger in the event of rupture or impact.

The invention also has as its object a process for the production of a sensor or detector device 1 as described above.

This process essentially consists in providing a tubular box 2, a detection component 12 (for example, a coil or an arrangement of resin-coated coils) designed to form the active surface and to seal a first longitudinal end 3 of said tubular box 2, an electronic card 6 that carries the electronic components 6', 6" of the sensor or detector, a connecting cable 4 and a plug 5 that can seal the second end 3' of the tubular box 2 and that has a passage 13 for the cable, to connect electrically between them the detection component 12, the card 6 and the connecting cable 4, to mount these components in the box 2, and to inject an insulating filler material 7, such as a resin, into the box 2.

In accordance with the invention, this process next consists in installing by interlocking the plug 5 at the second end 3' of the box 2 in such a way that the positioning means 8, 10, 10' of the latter engages with the corresponding end of the card 6 and keeps the latter in position in the box (in cantilever position) and that the second end 3' is sealed in an airtight manner, in positioning the box 2 in such a way that the residual air that is optionally present in said box 2 accumulates in a peripheral region 16 that is removed from the card 6 and its electronic components 6', and, finally, in waiting for the filler material 7 to solidify.

It should be noted that the eccentric arrangement of the passage hole 13 of the cable 4 in the plug 5 contributes to the referencing of the orientation of the card 6 inside the socket 2.

By combining a suitable drying substrate (FIG. 3—substrate that obtains from its definition an orientation and a preferred slope of the socket 2) with such a unit, it is possible from the outside, during the drying phase of the resin 7, to control precisely the location or the region where the little air remaining in the socket will be confined (during the drying of the resin).

This arrangement makes it possible to position the residual air bubble 16 in a zone lacking any components 6', 6" and thus to ensure good impregnation of resin 7 over all of the electronic components.

Of course, the invention is not limited to the embodiments described and shown in the accompanying drawings. Modifications are possible, in particular from the standpoint of the composition of the various elements or by substitution of equivalent techniques, without thereby exceeding the field of protection of the invention.

The invention claimed is:

1. A sensor or detector device, comprising:
    a box in the form of a tubular hollow body with a first longitudinal end that forms an active surface, and a second end, opposite to the first end, with an opening, through which a connecting cable passes and that is sealed by a connected plug;
    a card or an analogous substrate, carrying electronic components of said sensor or detector and mounted in said box, coated in an insulating filler material present in said box and filling approximately the entire remaining inside volume of said box; and
    a mechanical means (8) for positioning and wedging the card (6) in the box (2), said mechanical means (8) being entirely integrated in the plug (5) and comprising at least one portion of a groove or slot that can accommodate by engagement one end (6''') of said card (6) to hold said card wedged,
    wherein the at least one portion of a groove or slot is made in the plug (5), at least partially bordered by a projecting formation (10) that extends an interlocked longitudinal portion (5') of said plug (5), said groove or slot portion being able to accommodate, to be held wedged, the end of the card (6) that is located close to the second end (3') of the box (2), and wherein the projecting formation (10), extended from the interlocked portion (5'), has an end configured to come into immediate proximity or into contact with at least one light source (6") that is carried by the card (6), at least a part of the plug (5) with the projecting formation (10) being produced from a material that can transmit light.

2. The device according to claim 1, wherein the mechanical means (8) comprises two groove portions that are spaced and aligned along a median plane (PM) of the box (2), and wherein the card (6) has, at its end located close to the second end (3') of the box (2), a cut-out (11) that defines two feet or side wings (11') configured to engage in said groove portions of the plug (5).

3. The device according to claim 2, wherein the card (6) is accommodated in the groove portions that form the mechanical means (8) of positioning and wedging at least enough to hold said card (6).

4. The device according to claim 2, wherein the plug (5) comprises a passage opening (13) for the cable (4), which is offset relative to a longitudinal median axis (AM) of the box (2), and wherein said passage opening (13) that passes through the sealing body (9) of the plug (5) has a longitudinal extension configured in such a way that said plug (5) forms a cable-guide sleeve.

5. The device according to claim 4, wherein a median axis (AM') of the passage opening (13) is offset laterally relative to the median plane (PM) of the box (2), wherein the connecting cable (4) extends just into the cut-out (11) made in the corresponding end of the card (6), and wherein the projecting formations (10, 10') that define the groove portions (8) extend in a fractional manner the cable-guide sleeve that is defined by the passage opening (13), in at least the interlocked portion (5') of the plug (5).

6. The device according to claim 5, wherein the passage opening (13) of the plug (5) comprises, at its opening toward the outside, a beveled edge (14).

7. The device according to claim 4, wherein the passage opening (13) of the plug (5) comprises, at its opening toward the outside, a beveled edge (14).

8. The device according to claim 4, wherein the passage opening (13) for the connecting cable (4) of the device (1) has variable cross-sections along its longitudinal median axis (AM').

9. The device according to claim 8, wherein the passage opening (13) comprises at least one first longitudinal segment (17) that is open on the outside, of which the cross-section corresponds to that of said cable (4), and at least a second longitudinal segment (17') that is open on the inside, whose cross-section is at least slightly larger than that of said cable (4).

10. The device according to claim 9, wherein the first segment (17) ends with a radially projecting annular formation that constitutes an oriented holding collar, followed by a beveled widening (14), and wherein the second segment (17') extends by the projecting formations (10, 10') of the means (8) for the integrated positioning with the plug (5).

11. The device according to claim 1, wherein the projecting formation of the plug (5) corresponds to the groove or slot portion.

12. The device according to claim 1, wherein the box (2) comprises a socket, and wherein the longitudinal portion (5') of the plug (5) that is interlocked in the box (2) has a tapered shape.

13. A process for the production of a sensor or detector device according to claim 1, comprising:

providing a tubular box, a detection component that is configured to form the active surface and to seal a first longitudinal end of said tubular box, an electronic card that carries the electronic components of the sensor or detector, a connecting cable, and a plug that can seal the second end of the tubular box and that has a passage for the cable to connect electrically between them the detection component, the card and the connecting cable, to mount these components in the box, and to inject an insulating filler material into the box;

installing by interlocking the plug (5) at the second end (3') of the box (2) in such a way that the positioning means (8, 10, 10') of the latter engages with the corresponding end of the card (6) and keeps the latter in position in the box, and wherein the second end (3') is sealed in an airtight manner, to position the box (2) in such a way that any residual air present in said box (2) accumulates in a peripheral region (16) that is removed from the card (6) and its electronic components (6'); and waiting for the insulating filler material (7) to solidify.

14. The device according to claim 1, wherein the plug (5) comprises a passage opening (13) for the cable (4), which is offset relative to the longitudinal median axis (AM) of the box (2), and wherein said passage opening (13) that passes through the sealing body (9) of the plug (5) has a longitudinal extension configured in such a way that said plug (5) forms a cable-guide sleeve.

15. The device according to claim 14, wherein the passage opening (13) of the plug (5) comprises, at its opening toward the outside, a beveled edge (14).

16. The device according to claim 14, wherein the passage opening (13) for the connecting cable (4) of the device (1) has variable cross-sections along its longitudinal median axis (AM').

17. A sensor or detector device, comprising:

a box in the form of a tubular hollow body with a first longitudinal end that forms an active surface, and a second end, opposite to the first end, with an opening, through which a connecting cable passes and that is sealed by a connected plug;

a card or an analogous substrate, carrying electronic components of said sensor or detector and mounted in said box, coated in an insulating filler material present in said box and filling approximately the entire remaining inside volume of said box; and a mechanical means (8) for positioning and wedging the card (6) in the box (2), at least a portion of said mechanical means (8) being integrated in the plug (5) and comprising at least one portion of a groove or slot that can accommodate by engagement one end (6''') of said card (6) to hold said card wedged, wherein the plug (5) comprises a projecting formation (10), extended from the interlocked portion (5'), whose end is configured to come into immediate proximity or into contact with at least one light source (6") that is carried by the card (6), at least a part of the plug (5), with a projecting formation (10) forming an extension, being produced from a material that can transmit light.

18. A process for the production of a sensor or detector device, comprising:

providing a tubular box and a detection component that is configured to form an active surface and to seal a first longitudinal end of said tubular box, an electronic card that carries the electronic components of the sensor or detector, a connecting cable, and a plug that can seal the second end of the tubular box and that has a passage for the cable to connect electrically between them the detection component, the card and the connecting cable, to mount these components in the tubular box, and to inject an insulating filler material into the tubular box;

installing by interlocking the plug at the second end of the tubular box in such a way that the positioning means of the latter engages with the corresponding end of the card and keeps the latter in position in the tubular box, and wherein the second end is sealed in an airtight manner, to position the tubular box in such a way that any residual air present in said tubular box accumulates in a peripheral region that is removed from the card and its electronic components; and waiting for the insulating filler material to solidify, wherein the plug comprises a projecting formation, extended from the interlocked portion, whose end is configured to come into immediate proximity or into contact with at least one light source that is carried by the card, at least a part of the plug, with a projecting formation forming an extension, being produced from a material that can transmit light.

\* \* \* \* \*